United States Patent
Usui et al.

(10) Patent No.: US 12,152,656 B2
(45) Date of Patent: Nov. 26, 2024

(54) ELECTRIC ACTUATOR

(71) Applicant: Hitachi Astemo, Ltd., Ibaraki (JP)

(72) Inventors: Koji Usui, Ibaraki (JP); Ryo Ueyama, Ibaraki (JP); Takenori Iso, Ibaraki (JP); Hiromu Narukawa, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/037,165

(22) PCT Filed: Nov. 12, 2021

(86) PCT No.: PCT/JP2021/041732
§ 371 (c)(1),
(2) Date: May 16, 2023

(87) PCT Pub. No.: WO2022/113780
PCT Pub. Date: Jun. 2, 2022

(65) Prior Publication Data
US 2024/0003410 A1    Jan. 4, 2024

(30) Foreign Application Priority Data

Nov. 26, 2020 (JP) .................................. 2020-196344

(51) Int. Cl.
*F16H 25/24* (2006.01)
*F16H 57/04* (2010.01)
*F16H 25/20* (2006.01)

(52) U.S. Cl.
CPC ......... *F16H 25/24* (2013.01); *F16H 57/0464* (2013.01); *F16H 57/0497* (2013.01); *F16H 2025/2081* (2013.01)

(58) Field of Classification Search
CPC ............. F16H 57/0497; F16H 57/0464; F16H 25/2418; F16H 2025/204
See application file for complete search history.

(56) References Cited

U.S. PATENT DOCUMENTS 6,089,113 A      7/2000  Sato et al.
8,051,730 B2 *  11/2011  Jiang .................. F16H 57/0497
                                                    74/89.44

(Continued)

FOREIGN PATENT DOCUMENTS

DE    10 2011 121 765    6/2013
DE    10 2015 214 824    2/2017

(Continued)

OTHER PUBLICATIONS

International Search Report issued Jan. 25, 2022 in corresponding International Application No. PCT/JP2021/041732, with English language translation.

(Continued)

*Primary Examiner* — Gregory Robert Weber
(74) *Attorney, Agent, or Firm* — Wenderoth, Lind & Ponack, L.L.P.

(57) ABSTRACT

An electric actuator includes an electric motor, a nut, and a screw shaft threadedly inserted through the nut so as to be able to advance and retreat. The threads of the screw shaft include two flanks and a crest portion connecting the two flanks to each other. Grease is used as a lubricant. A groove portion, which is cut out from the crest portion toward a root portion side of the threads and holds grease, is formed on the threads of the screw shaft. Further, a tapered surface is formed at a groove portion side end of at least one of the two flanks, and the tapered surface inclines in a direction away from the groove portion and drags the grease held in the groove portion onto a threadedly engaged portion with the aid of the wedge effect. As a result, the electric actuator can promote lubrication.

8 Claims, 12 Drawing Sheets

(56) References Cited

U.S. PATENT DOCUMENTS

| | | | |
|---|---|---|---|
| 9,908,183 B2* | 3/2018 | Faessler | B23B 51/101 |
| 10,935,116 B2* | 3/2021 | Kubota | F16H 25/22 |
| 2009/0247364 A1 | 10/2009 | Sano et al. | |

FOREIGN PATENT DOCUMENTS

| | | |
|---|---|---|
| DE | 10 2017 209 685 | 12/2018 |
| JP | 53-138603 | 4/1952 |
| JP | 59-137452 | 9/1984 |
| JP | 63-112657 | 7/1988 |
| JP | 10-231912 | 9/1998 |
| JP | 2014-141214 | 8/2014 |
| JP | 2018-34686 | 3/2018 |
| JP | 2019-113149 | 7/2019 |
| WO | 2006/003983 | 1/2006 |

OTHER PUBLICATIONS

Written Opinion of the International Searching Authority issued Jan. 25, 2022 in corresponding International Application No. PCT/JP2021/041732, with English language translation.

Extended European Search Report issued Sep. 17, 2024 in corresponding European Patent Application No. 21897754.4.

* cited by examiner

ELECTRIC ACTUATOR

TECHNICAL FIELD

The present invention relates to an electric actuator including a motion conversion mechanism that converts a rotation of a first screw member caused by an electric motor into a linear motion of a second screw member threadedly inserted through this first screw member.

BACKGROUND ART

Electric actuators include an electric motor, and a motion conversion mechanism that converts a rotation of this electric motor into a linear motion of a screw member. Then, the motion conversion mechanism includes a first screw member (a nut) rotationally driven by the electric motor and a second screw member (a screw shaft) threadedly inserted through this first screw member, and functions to convert the rotation of the electric motor (the first screw member) into the linear motion of the second screw member. Such an electric actuator is used in, for example, an electric brake apparatus of a vehicle (for example, refer to PTL 1).

Then, the motion conversion mechanism of the electric actuator involves such a problem that, since the second screw member threadedly inserted through the rotating first screw member linearly moves relative to the first screw member, sliding friction occurs on a threadedly engaged portion between this second screw member and the first screw member, and the motion conversion efficiency reduces due to this sliding friction and wear is also generated on the threadedly engaged portion between the first screw member and the second screw member.

In light thereof, PTL 2 proposes a configuration in which a serpentine helical thin oil groove is formed on a thread surface (a flank) of a feed screw (the second screw member). Further, this PTL 2 proposes a configuration in which one linear oil groove parallel with an axis and having a depth deeper than a root surface of the thread is formed on the outer peripheral portion of the feed screw (the second screw member).

PTL 3 proposes that a plurality of groove portions curved in circular arc shapes is formed on one of two flanks of the respective threads of a first screw portion (the first screw member) and a second screw portion (the second screw member) in the circumferential direction thereof. Then, a first surface extending from a root portion toward a crest portion of the thread and a second surface extending from a bottom portion of this first surface toward the root portion of the thread are formed on each of the groove portions, and an inclination angle of the first surface with respect to the flank is set to be smaller than an inclination angle of the second surface with respect to the flank.

PTL 4 proposes that, with respect to a first flank (a flank that transmits a force) and a second flank (a flank located axially opposite from the first flank) of the respective threads of a rotational screw member (the first screw member) and a linear-motion screw member (the second screw member), a recessed portion for containing lubricant oil is formed only on the first flank of them in a grid-like manner by knurling processing.

CITATION LIST

Patent Literature

PTL 1: Japanese Patent Application Public Disclosure No. 2014-141214

PTL 2: Japanese Utility Model Application Public Disclosure No. S59-137452

PTL 3: Japanese Patent Application Public Disclosure No. 2018034686

PTL 4: Japanese Patent Application Public Disclosure No. 2019-113149

SUMMARY OF INVENTION

Technical Problem

However, there is such a problem that it is not easy to form the helical oil groove proposed in PTL 2, the circular arc-shaped groove portions proposed in PTL 3, and the grid-shaped recessed portion proposed in PTL 4 on the flank of the thread, and the processing thereof requires considerable man-hours, time, and cost.

Further, the linear oil groove proposed in PTL 2 is easy to process, but this oil groove has a problem that the lubrication effect thereof is low because only one oil groove is formed on the outer peripheral portion of the feed screw (the second screw member). Then, this oil groove also raises a problem that the strength of the feed screw locally falls short because the depth of the oil groove is deeper than the root surface of the thread.

The present invention has been made in consideration of the above-described problems, and an object thereof is to provide an electric actuator capable of promoting lubrication on a threadedly engaged portion between a first screw member and a second screw member to improve motion conversion efficiency and reduce wear on the threadedly engaged portion by allowing a groove portion for holding grease to be formed easily with excellent workability.

Solution to Problem

To achieve the above-described object, according to a first feature of the present invention, an electric actuator includes an electric motor, a first screw member configured to be rotationally driven by the electric motor, and a second screw member threadedly inserted through the first screw member linearly movably. Each of threads of the first screw member and the second screw member includes two flanks and a crest portion connecting the flanks to each other, and a threadedly engaged portion between the first screw member and the second screw member is lubricated with grease. A groove portion, which is cut out from the crest portion toward a root portion side, is formed on each of the threads of at least one of the first screw member or the second screw member. A taper surface, which flares as becoming circumferentially farther away from the groove portion, is formed on at least a part of each of peripheral edges of the groove portion on flank sides.

Further, according to a second feature of the present invention, in addition to the first feature, a plurality of the groove portions is arranged on the same straight line extending along an axial direction of at least one of the first screw shaft or the second screw shaft.

Further, according to a third feature of the present invention, in addition to the first or second feature, the groove portion includes a plurality of groove portions formed in a circumferential direction of the thread of at least one of the first screw member or the second screw member.

Further, according to a fourth feature of the present invention, in addition to any of the first to third features, the groove portions are each formed with a depth in a range from the crest portion to the root portion in a height direction of the thread.

Further, according to a fifth feature of the present invention, in addition to any of the first to fourth features, a grease holding portion is formed on an inner periphery of one axial end of the first screw member. The grease holding portion has an outer diameter larger than a maximum diameter of the second screw member, and can contain the grease between the grease holding portion and the second screw member. A cover member covering an axial opening end of the grease holding portion is provided.

Further, according to a sixth feature of the present invention, in addition to the fifth feature, the cover member integrally includes a cover portion and a tubular portion coaxial with the first screw member. A cylindrical scraper portion is formed on an inner periphery of the cover portion, and an inner diameter of the scraper portion is set to be slightly larger than an outer diameter of the second screw member, by which a radial extremely small space is formed between the scraper portion and the second screw member.

Advantageous Effects of Invention

According to the first feature of the present invention, each groove portion is formed by cutting out a part of each of the threads of at least one of the first screw member or the second screw member from the crest portion toward the root portion side. Therefore, the present invention can allow the groove portion for holding the grease to be formed easily with excellent workability, thereby achieving a cost reduction of this electric actuator due to reductions in the processing man-hours and the processing time.

Further, the present invention allows the grease held in each groove portion to be supplied to the threadedly engaged portion between the first screw member and the second screw member to lubricate the threadedly engaged portion, thereby reducing friction on the threadedly engaged portion to thus enhance the motion conversion efficiency, and also reduce wear on the threadedly engaged portion to increase the durability of the first screw member and the second screw member. Especially, in the present invention, the taper surface is formed on at least a part of each of the peripheral edges of each groove portion on the flank sides. The taper surface flares as becoming circumferentially farther away from the groove portion. Therefore, the grease held in each groove portion is efficiently supplied by being dragged onto the threadedly engaged portion between the first screw member and the second screw member with the aid of the wedge effect due to the taper surface, and this grease is provided for effective lubrication of the threadedly engaged portion.

Further, according to the second feature of the present invention, the plurality of groove portions is arranged on the same straight line extending along the axial direction of at least one of the first screw shaft or the second screw shaft, and therefore the plurality of groove portions can be formed easily with excellent workability.

Further, according to the third feature of the present invention, the plurality of groove portions is formed on each of the threads of at least one of the first screw member or the second screw member in the circumferential direction thereof. Therefore, the present invention allows a further large amount of grease to be held by each of the threads, thereby allowing the threadedly engaged portion between the first screw member and the second screw member to be effectively lubricated due to the large amount of grease held in the plurality of groove portions. Further, the grease is circumferentially evenly supplied to the threadedly engaged portion between the first screw member and the second screw member, and this also contributes to effective lubrication of the threadedly engaged portion with the grease.

Further, according to the fourth feature of the present invention, the groove portions are each formed with the depth in the range from the crest portion to the root portion in the height direction of each of the threads, and are each prevented from being formed beyond the root portion to the radially inner side thereof. Therefore, the present invention can improve the workability of the groove portions, and also prevent a local reduction in the strength of the first screw member and the second screw member. On the other hand, in a case where the threads are formed by cutting, providing the groove portions deeply beyond the root portions of the threads causes burrs to enter the groove portions, and these burrs are not easy to remove.

Further, according to the fifth feature of the present invention, even when the second screw member enters inside the first screw member according to the rotation of the first screw member, the grease applied to the second screw member is held in the grease holding portion of the first screw member. As a result, the present invention prevents that surplus grease is collected on the end surface of the first screw member, thereby preventing that the collected grease scatters around under a centrifugal force generated due to the rotation of the first screw member. Further, the grease held in the grease holding portion of the first screw member is applied to the second screw member when the second screw member exits out of the first screw member, and the application amount of this grease is regulated by the cover member, and therefore the grease is applied over a wide range of the second screw member by a necessary and sufficient amount. As a result, the present invention can prevent partial grease insufficiency (oil film shortage) on the second screw member and achieve sufficient lubrication of the threadedly engaged portion between the first screw member and the second screw member, thereby acquiring high motion conversion efficiency, and also reducing wear on the threadedly engaged portion to thus increase the durability of the first screw member and the second screw member.

Further, according to the sixth feature of the present invention, the inner diameter of the scraper portion formed on the inner periphery of the cover portion of the cover member is set to be slightly larger than the outer diameter of the second screw member, by which the radial extremely small space is formed between them. Accordingly, the grease stored in the grease holding portion of the first screw member is scraped by the scraper portion, and is evenly applied to the second screw member with a predetermined thickness. In this case, because the scraper portion is out of contact with the second screw member, no frictional resistance force is generated therebetween, and the second screw member can maintain a smooth sliding movement without receiving resistance. Further, because the scraper portion is not subjected to an external force from the second screw member, the scraper portion is prevented from incurring damage and the durability of the cover member can be increased.

Figure 1:
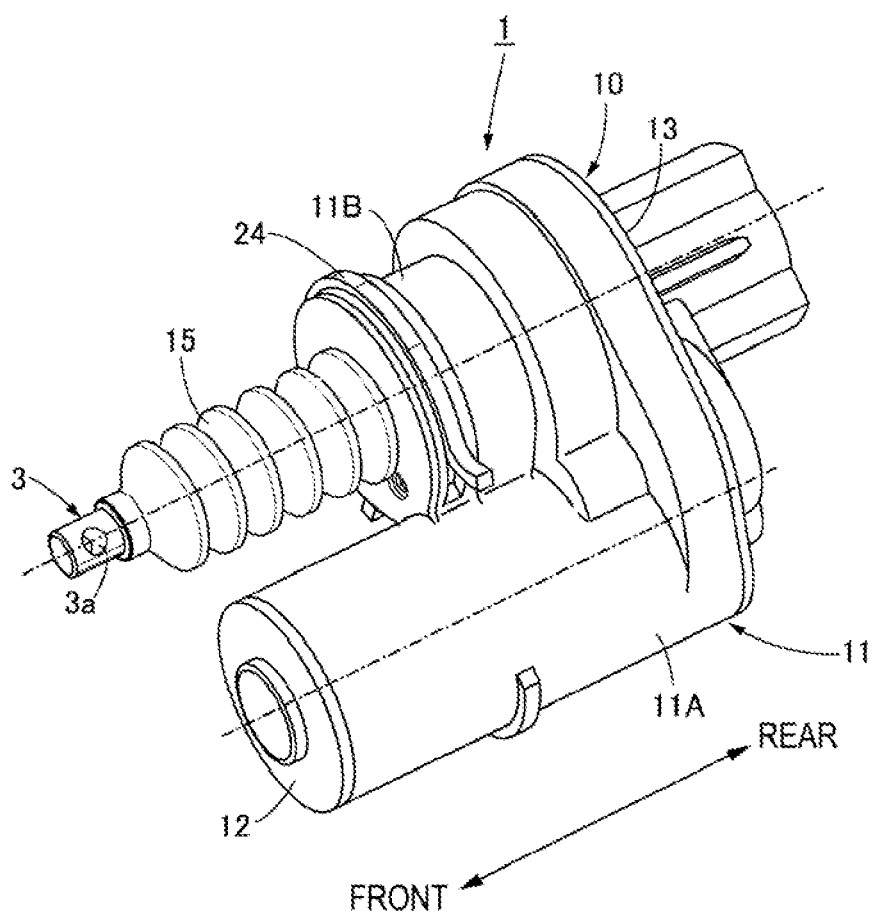
FIG. 1 is a perspective view of an electric actuator according to the present invention.

REFERENCE SIGNS LIST 1 electric actuator
2 electric motor
3 screw shaft (second screw member)
3b male screw of screw shaft
3b1 thread of screw shaft
3b11 flank of thread
3b12 crest portion of thread
3b13 root portion of thread
3c taper surface of thread
4 motion conversion mechanism
5 transmission mechanism
8 nut (first screw member)
8a female screw of nut
8a1 thread of nut
21 groove portion
22 grease holding portion
23 cover member
23A cover portion of cover member
23B tubular portion of cover member
23b scraper portion of cover member
φD inner diameter of scraper portion
φd outer diameter of screw shaft
δ extremely small space

DESCRIPTION OF EMBODIMENTS

In the following description, an embodiment of the present invention will be described with reference to the accompanying drawings.

Figure 2:
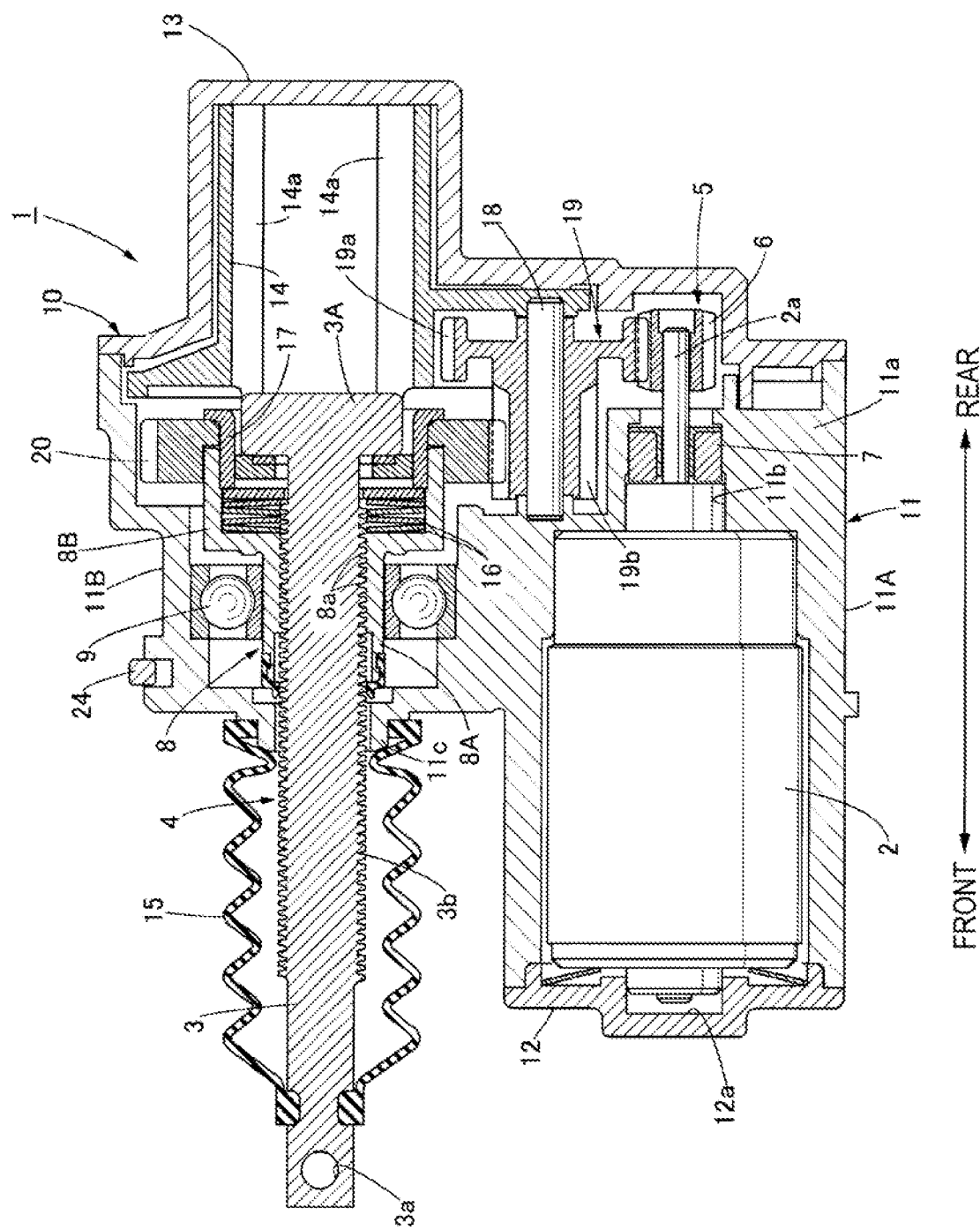
FIG. 2 is a plan cross-sectional view of the electric actuator according to the present invention.

FIG. 1 is a perspective view of an electric actuator according to the present invention, and FIG. 2 is a plan cross-sectional view of this electric actuator.

The electric actuator 1 according to the present embodiment is intended to be mounted on a not-illustrated electric parking brake apparatus, and includes an electric motor 2, a motion conversion mechanism 4, and a transmission mechanism (a gear mechanism) 5 as illustrated in FIG. 2. The electric motor 2 is a driving source, and is forwardly and reversely rotatable. The motion conversion mechanism 4 converts the rotation of this electric motor 2 into a reciprocating linear motion of a screw shaft 3, which is a second screw member. The transmission mechanism 5 functions to transmit the rotation of the electric motor 2 to the motion conversion mechanism 4. These electric motor 2, motion conversion mechanism 4, and transmission mechanism 5 are contained in an actuator case 10. In the following description, a direction indicated by arrows illustrated in FIGS. 1 and 2 will be defined to be a "front-rear direction".

The above-described actuator case 10 includes a case main body 11, a motor cover 12, and a gear cover 13. The case main body 11 integrally includes a cylindrical first case 11A and a second case 11B. The motor cover 12 is attached to the opening end of the first case 11A of this case main body 11 so as to cover it. The gear cover 13 is attached to the opening end of the case main body 11 so as to cover it from the opposite side from this motor cover 12 (the right side in FIG. 2).

Then, as illustrated in FIG. 2, the electric motor 2 is contained in the first case 11A of the case main body 11, and a small-diameter driving gear 6 is attached to the end portion (the rear end portion) of an output shaft (a motor shaft) 2a extending from this electric motor 2 rearward (to the right side in FIG. 2) that faces inside the gear cover 13. Now, one axial end (the front end) of the electric motor 2 is fittedly held in a recessed portion 12a formed on the motor cover 12, and the other axial end (the rear end) of this electric motor 2 is fittedly held in a circular hole 11b formed on an end wall 11a of the first case 11A. The output shaft (the motor shaft) 2a of the electric motor 2 is rotatably supported on the first case 11A via a bearing 7.

Further, the second case 11B of the case main body 11 is integrally disposed on the side of the first case 11A, and the motion conversion mechanism 4 is contained in this second case 11D. This motion conversion mechanism 4 includes a rotatable nut 8, which is a first screw member, and the above-described screw shaft 3, which is the second screw member threadedly inserted through this nut 8 linearly movably.

The above-described nut 8 integrally includes a sleeve portion 8A and a drum portion 8B large in diameter than this sleeve portion 8A, and is rotatably supported on the second case 11B via a radial bearing (a ball bearing) 9 set on the outer periphery of the sleeve portion 8A. Then, a female screw 8a is helically provided by being engraved on the inner periphery of the sleeve portion 8A.

The screw shaft 3 is a round rod-shaped slide member elongated in the front-rear direction, and a not-illustrated brake cable is coupled in a circular hole 3a formed at the front end portion thereof and the other end of this brake cable is coupled with a parking brake lever of the not-illustrated electric parking brake apparatus. Further, a flange portion 3A is integrally formed at the rear end of the screw shaft 3, and the outer periphery of this flange portion 3A is engaged with a pair of guide grooves 14a formed along the axial direction on the inner periphery of a tubular guide member 14 contained in the gear cover 13. Therefore, the rotation of the screw shaft 3 is prohibited by the guide member 14, and the screw shaft 3 linearly reciprocates in the front-rear direction without rotating.

Then, a male screw 3b is helically provided by being engraved in a predetermined range of the outer periphery of the screw shaft 3, and the screw shaft 3 is threadedly inserted through the sleeve portion 8A of the nut 8. Therefore, the male screw 3b provided by being engraved on the outer periphery of this screw shaft 3 and the female screw 8a provided by being engraved on the inner periphery of the sleeve portion 8A of the nut 8 are threadedly engaged with each other at the portion of the screw shaft 3 inserted through the nut 8.

Further, a portion of the screw shaft 3 that extends out of the actuator case 10 is covered with an extensible and compressible bellows-like boot 15 made from a flexible and elastic rubber material or the like. One end (the front end) of this boot 15 is fittedly attached to the outer periphery of the front end portion of the screw shaft 3, and the other end (the rear end) of this boot 15 is fittedly attached to the outer periphery of a tubular portion 11c provided in a protruding manner on the second case 11B of the actuator case 10.

Then, as illustrated in FIG. 2, a plurality of disc springs 16 is contained in an axially stacked state in an axial space formed between the drum portion 8B and the flange portion 3A of the screw shaft 3 inside the drum portion 8B of the nut 8, and the axial positions of these disc springs 16 are regulated by a retainer 17 in abutment with the flange portion 3A of the screw shaft 3. These disc springs 16 form a biasing unit that biases the screw shaft 3 in a direction away from the nut 8 (rearward).

Then, the configuration of the transmission mechanism 5 will be described now with reference to FIG. 2.

The transmission mechanism 5 functions to transmit the rotation of the output shaft 2a of the electric motor 2 to the nut 8 of the motion conversion mechanism 4, and includes the above-described driving gear 6 attached to the output shaft 2a of the electric motor 2, an intermediate gear 19 rotatably supported by a support shaft 18, and a driven gear 20 attached on the outer periphery of the drum portion 8B of the nut 8.

The above-described intermediate gear 19 is rotatably supported by the support shaft 18 provided so as to hang across between the case main body 11 of the actuator case 10 and the guide member 14, and integrally includes a large-diameter intermediate gear 19a and a small-diameter intermediate gear 19b having large and small different diameters, respectively. Now, the large-diameter intermediate gear 19a is meshed with the driving gear 6, and the diameter thereof is set to be larger than the diameter of the driving gear 6. Further, the small-diameter intermediate gear 19b is meshed with the driven gear 20 larger in diameter than that, and the driven gear 20 is fittedly attached to the outer periphery of the drum portion 8B of the nut 8.

Next, a characteristic configuration of the present invention will be described now with reference to FIGS. 3 to 11.

Figure 3:
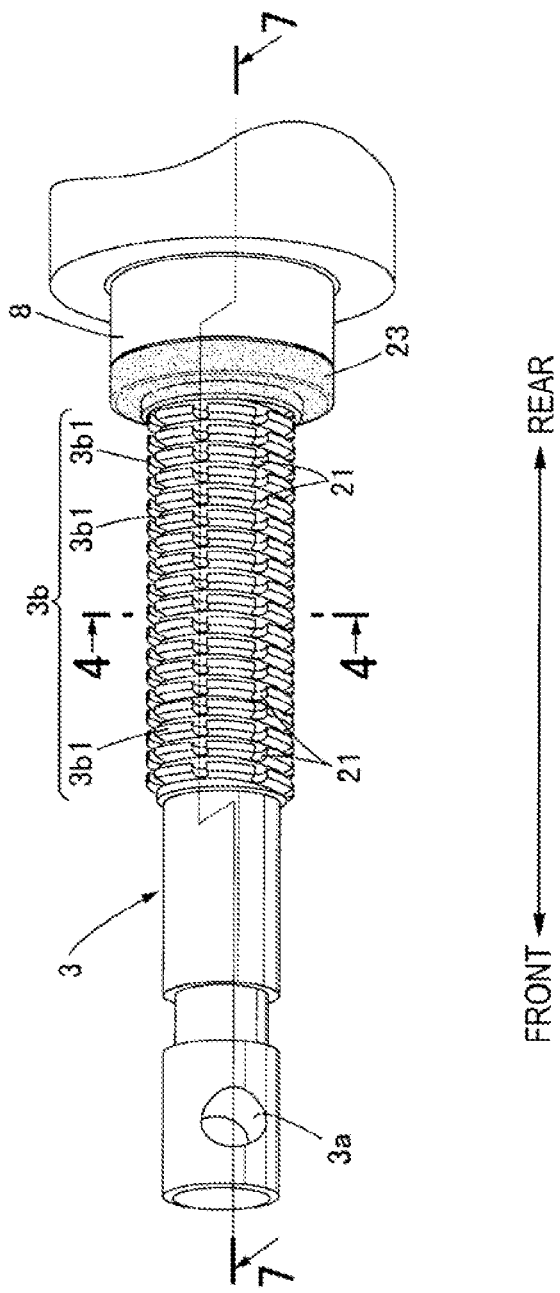
FIG. 3 is a plan view of a nut and screw shaft portion of the electric actuator according to the present invention.
Figure 4:
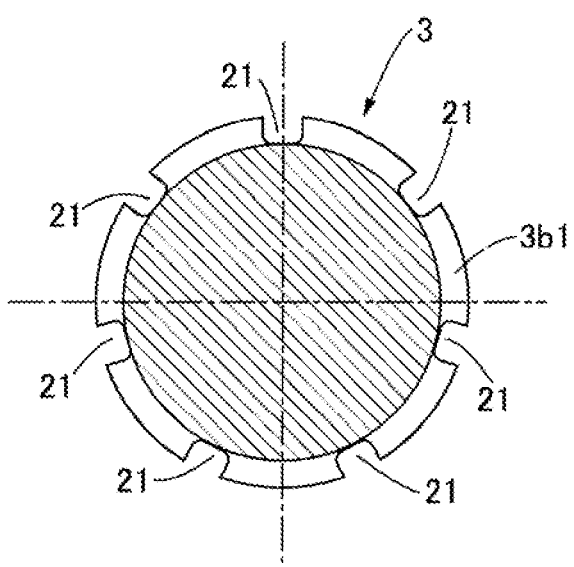
FIG. 4 is a cross-sectional view taken along a line 4-4 illustrated in FIG. 3.
Figure 5:
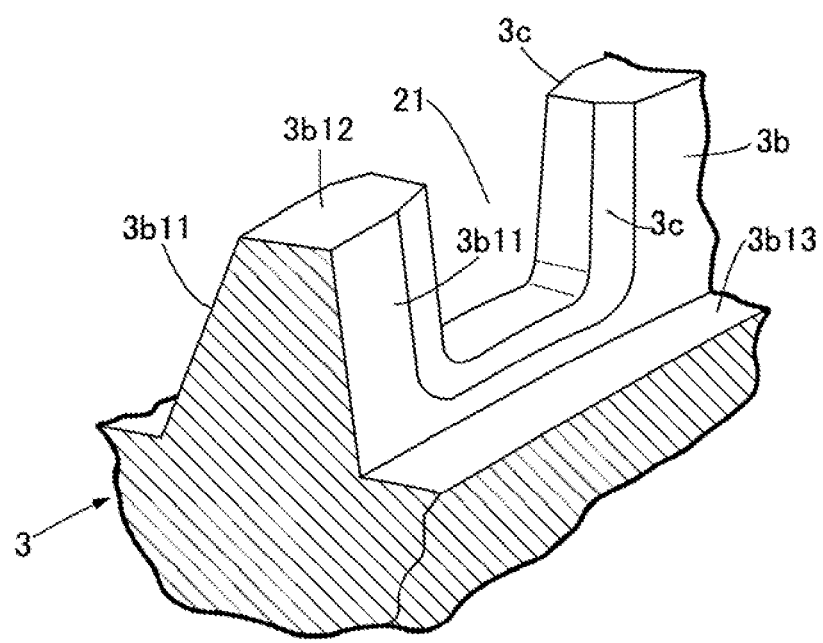
FIG. 5 is a partial perspective view illustrating a groove portion formed on a thread of the screw shaft of the electric actuator according to the present invention.
Figure 6:
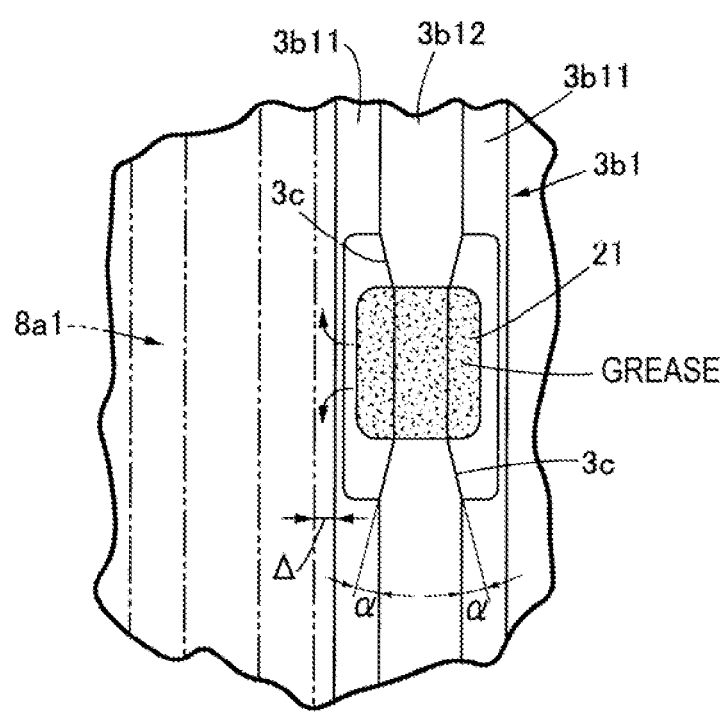
FIG. 6 is a partial plan view illustrating how grease is supplied to a threadedly engaged portion between the nut and the screw shaft in the electric actuator according to the present invention.
Figure 7:
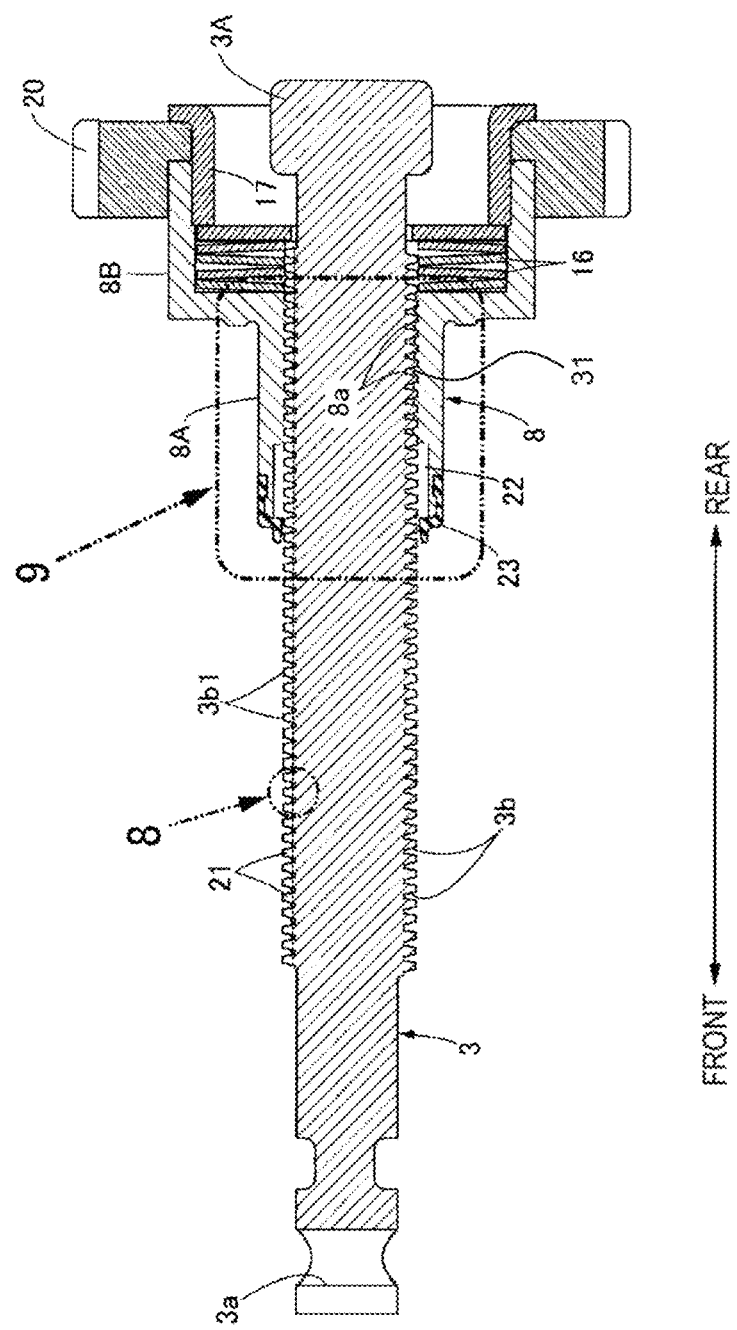
FIG. 7 is a cross-sectional view taken along a line 7-7 illustrated in FIG. 3.
Figure 8:
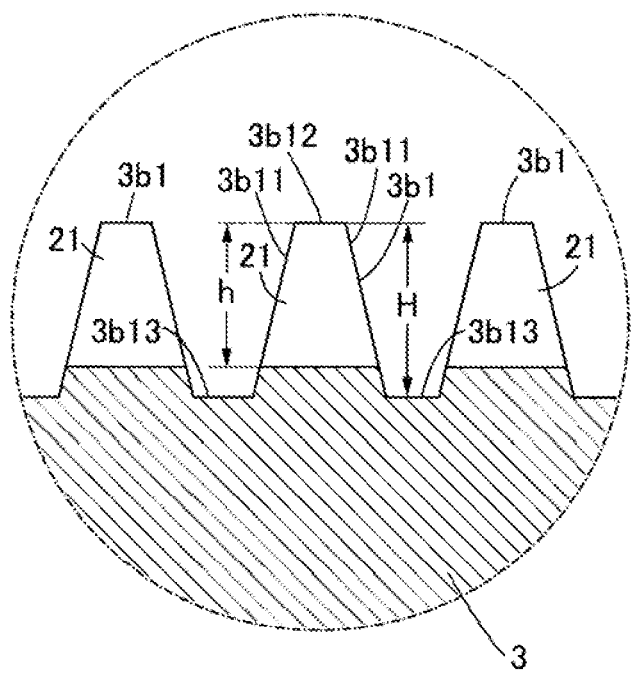
FIG. 8 is an enlarged detailed view of a portion labeled 8 in FIG. 7.
Figure 9:
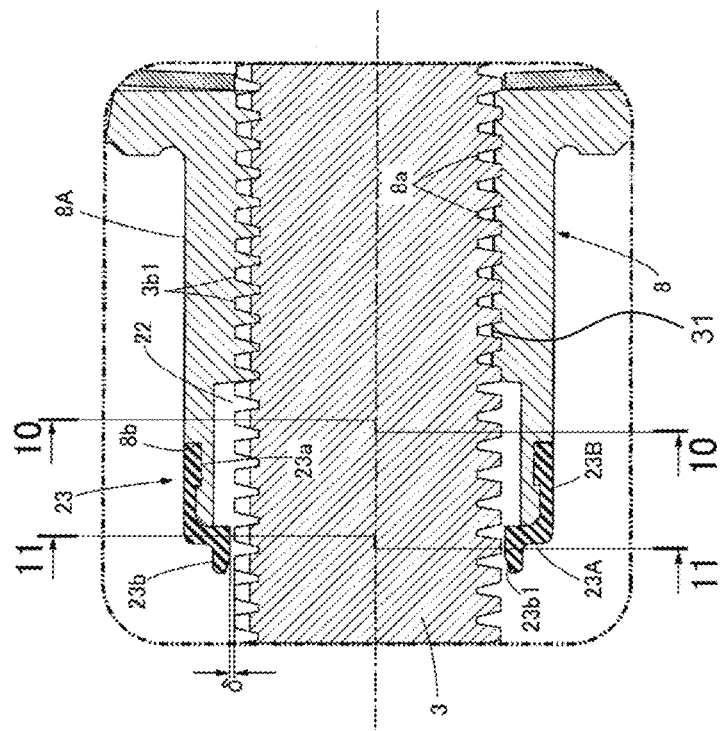
FIG. 9 is an enlarged detailed view of a portion labeled 9 in FIG. 7.
Figure 10:
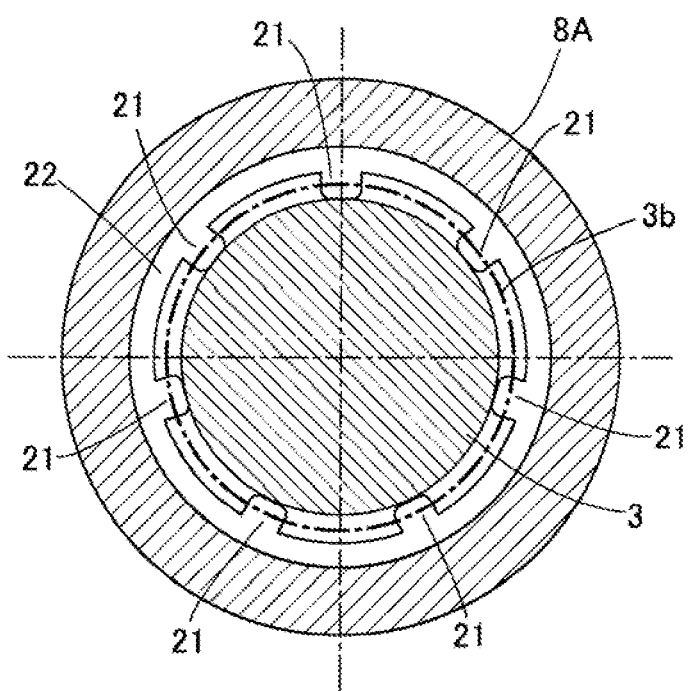
FIG. 10 is a cross-sectional view taken along a line 10-10 illustrated in FIG. 9.
Figure 11:
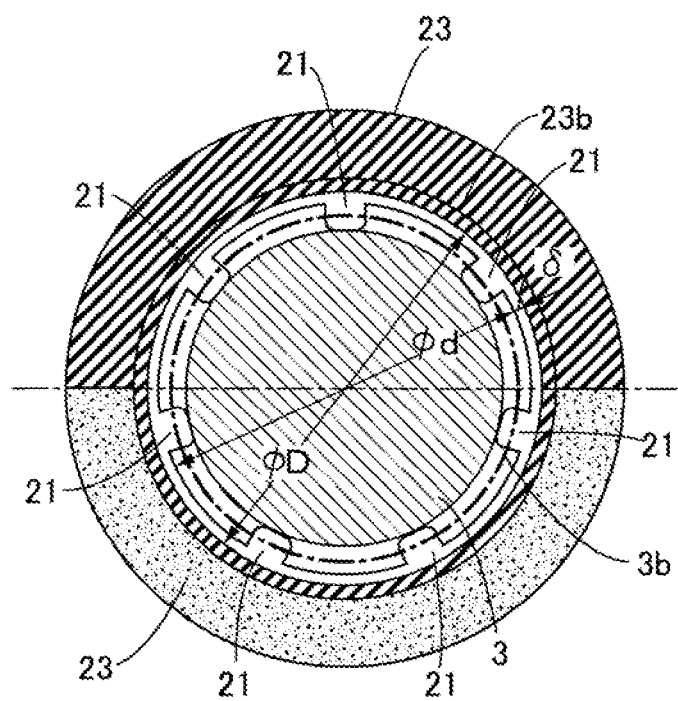
FIG. 11 is a cross-sectional view taken along a line 11-11 illustrated in FIG. 9.

FIG. 3 is a plan view of the nut and screw shaft portion of the electric actuator according to the present invention. FIG. 4 is a cross-sectional view taken along a line 4-4 illustrated in FIG. 3. FIG. 5 is a partial perspective view illustrating a groove portion formed on a thread of the screw shaft of the electric actuator according to the present invention. FIG. 6 is a partial plan view illustrating how grease is supplied to a threadedly engaged portion between the nut and the screw shaft in the electric actuator according to the present invention. FIG. 7 is a cross-sectional view taken along a line 7-7 illustrated in FIG. 3. FIG. 8 is an enlarged detailed view of a portion labeled 8 in FIG. 7. FIG. 9 is an enlarged detailed view of a portion labeled 9 in FIG. 7. FIG. 10 is a cross-sectional view taken along a line 10-10 illustrated in FIG. 9. FIG. 11 is a cross-sectional view taken along a line 11-11 illustrated in FIG. 9.

In the present embodiment, the helical male screw 3b is formed along the axial direction (the front-rear direction) on the outer periphery of the screw shaft 3 as illustrated in FIGS. 3, 7, and 8, and threads 3b1 of this male screw 3b each include two flanks (tooth flanks) 3b11 shaped as inclined surfaces, and a crest portion 3b12 connecting these flanks 3b11 to each other as illustrated in FIGS. 5 and 8. Then, in the present embodiment, generally rectangular groove-shaped groove portions 21, which are cut out from the crest portion 3b12 toward a root portion 3b13 side, are formed on each of the threads 3b1 of the screw shaft 3 as illustrated in FIGS. 5 to 9. Now, as illustrated in FIGS. 4, 5, and 8, the groove portions 21 are each formed with a depth h in a range from the crest portion 3b12 to the root portion 3b13 in the height direction of each of the threads 3b1. In other words, the depth h of each of the groove portions 21 is set to be smaller than a height H of the thread 3b (h<H).

Then, in the present embodiment, as illustrated in FIG. 4, seven groove portions 21 are formed on each of the threads 3b1 in the circumferential direction thereof at equiangular pitches. Then, as illustrated in FIG. 3, the plurality of groove portions 21 is arranged on the same straight line extending along the axial direction (the left-right direction in FIG. 3) on the male screw 3b of the screw shaft 3. This means that the plurality of groove portions 21 is disposed on the male screw 3b of the screw shaft 3 on each of seven straight lines in total that are circumferentially arranged and extend along the axial direction. The number of groove portions 21 on each of the threads 3b1 is not limited to seven, and may be any number as long as it is plural.

Further, as illustrated in FIGS. 5 and 6, a taper surface 3c, which flares at an illustrated angle α as becoming circumferentially farther away from the groove portion 21, is formed on each of the peripheral edges on the two flank 3b11 sides of the groove portion 21 (only one groove portion 21 is illustrated in FIGS. 5 and 6) formed on each of the threads 3b1 of the screw shaft 3. The taper surface 3c is formed throughout the entire range of the peripheral edge of the groove portion 21 on each of the two flanks 3b11 of the thread 3b in the present embodiment, but this taper surface 3c may be formed on a part of the peripheral edge of the groove portion 21.

On the other hand, the electric actuator 1 according to the present embodiment includes a grease holding portion 22 formed on the inner periphery of one axial end (the left-end portion in FIGS. 7 and 9) of the sleeve portion 8A of the nut 8. The grease holding portion 22 has an outer diameter larger than the diameter of the screw hole of this nut 8. Highly viscous grease, which serves as a lubricant, can be contained in this grease holding portion 22. Then, a cover member 23, which covers an axial opening end of the grease holding portion 22, is attached to the outer periphery of the one axial end portion (the front end portion) of the sleeve portion 8A of the nut 8.

The above-described cover member 23 is integrally molded from a rubber material, and integrally includes a ring plate-shaped cover portion 23A, which covers the axial opening end of the grease holding portion 22 from the axial direction, and a cylindrical tubular portion 23B, which is coaxial with the nut 8, as illustrated in FIG. 9. Then, as illustrated in FIG. 9, a ring-shaped protrusion portion 23a is integrally formed on the inner periphery of the end portion of the tubular portion 23B of the cover member 23 throughout the entire circumference thereof, and a ring groove-shaped recessed portion 8b is integrally formed on the outer periphery of the end portion of the sleeve portion 8A of the nut 8 throughout the entire circumference thereof.

Therefore, the cover member 23 can be attached to the outer periphery of the end portion of the sleeve portion 8A of the nut 8 easily with a single touch by fitting the protrusion portion 23a formed on the inner periphery of the end portion of the tubular portion 23B into the recessed portion 8b formed on the outer periphery of the end portion of the sleeve portion 8A of the nut 8. The protrusion portion 23a is formed on the tubular portion 23B side of the cover member 23 and the recessed portion 8b is formed on the sleeve portion SA side of the nut 8 in the present embodiment, but the cover member 23 can also be attached to the outer periphery of the end portion of the sleeve portion 8A of the nut 8 easily with a single touch by forming a recessed portion on the tubular portion 23B side of the cover member 23 and a protrusion portion on the sleeve portion 8B side of the nut 8 in an opposite manner therefrom and fitting these recessed portion and protrusion portion to each other.

Then, in the present embodiment, the outer diameter of the tubular portion 23B of the cover member 23 and the outer diameter of the sleeve portion 8A of the nut 8 are set to be equal to each other as illustrated in FIG. 9. Further, a cylindrical scraper portion (a scraping portion) 23b, which integrally protrudes forward (leftward in FIG. 9), is integrally formed on the inner periphery of the cover portion 23A of the cover member 23, and a taper surface 23b1, which has a diameter increasing forward (leftward in FIG. 9), is formed on the inner periphery of the front end of this scraper portion 23b. Now, as illustrated in FIG. 11, an inner diameter φD of the scraper portion 23b is set to be slightly larger than an outer diameter φd of the screw shaft 3 (φD>φd), and therefore a radial ring-shaped extremely-small space δ (=(D−d)/2) is formed between the scraper portion 23b and the screw shaft 3.

Figure 12:
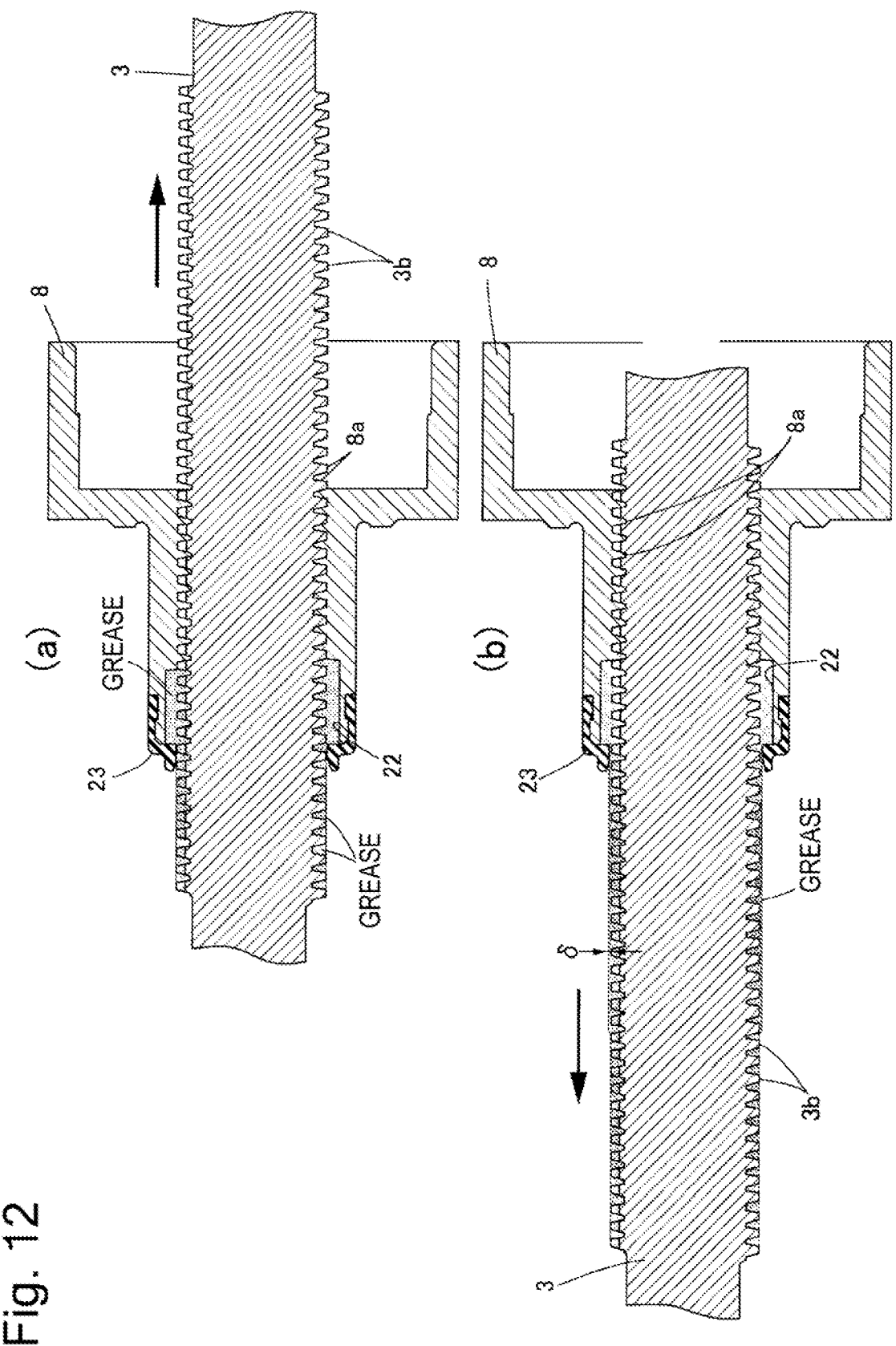
FIGS. 12(a) and 12(b) are partial cross-sectional views illustrating how the grease is applied to the screw shaft in the electric actuator according to the present invention.

Then, the electric actuator 1 configured in the above-described manner is used as an actuator of the not-illustrated electric parking brake apparatus, and, in the following description, the operations of this electric actuator 1 will be described now with reference to FIG. 12. The electric actuator t is positioned and fixed to the electric parking brake apparatus using a snap ring 24 (refer to FIGS. 1 and 2) fittedly attached to the outer periphery of the actuator case 10.

The state illustrated in FIG. 2 is a state in which the screw shaft 3 advances and the not-illustrated brake cable attached at the distal end of this screw shaft 3 is loosened, and brake shoes of a drum brake are separated from the inner peripheral surface of a brake drum in this state. This leads to generation of no frictional resistance force between the brake shoes and the brake drum and brings the electric parking brake apparatus into a state that the parking brake is released, allowing the brake drum and the wheel to freely rotate and thus allowing the vehicle to run.

When a not-illustrated parking brake switch is operated to ON from the above-described state, power is supplied to the electric motor 2 of the electric actuator 1, and this electric motor 2 is started up. Then, the rotation of the output shaft 2a of the electric motor 2 is transmitted to the motion conversion mechanism 4 while being slowed down by the transmission mechanism 5, and the rotation of the output shaft 2a of the electric motor 2 is converted into the linear motion (the rearward motion) of the screw shaft 3.

More specifically, the rotation of the output shaft 2a of the electric motor 2 is transmitted while being slowed down from the driving gear 6 to the intermediate gear 19, and this intermediate gear 19 rotates at a predetermined speed. Then, the rotation of this intermediate gear 19 is transmitted to the nut 8 of the motion conversion mechanism 4 while being slowed down via the small-diameter intermediate gear 19b and the driven gear 20 meshed with each other, and this nut 8 rotates at a predetermined speed.

As described above, when the nut 8 rotates, the screw shaft 3 threadedly inserted through this nut 8 linearly moves and retreats as illustrated in FIG. 12(a), and the not-illustrated brake cable attached to the distal end of this screw shaft 3 is pulled thereby. Accordingly, the parking brake lever of the electric parking brake apparatus is operated to thus spread open the brake shoes, and these brake shoes are pressed against the inner peripheral surface of the brake drum, as a result of which a frictional resistance force is generated between them. Then, the rotations of the brake drum and the wheel are braked due to this frictional resistance force, and therefore the vehicle is brought into the parking brake state.

When the not-illustrated parking brake switch is operated to OFF with the aim of releasing the above-described parking brake state, the electric motor 2 rotates reversely, and the rotation of the output shaft 2a thereof is transmitted to the nut 8 of the motion conversion mechanism 4 via a transmission route similar to the above-described route, and therefore this nut 8 rotates reversely. When the nut 8 rotates reversely in this manner, the screw shaft 3 threadedly inserted through this nut 8 linearly moves and advances in a direction indicated by an arrow in FIG. 12(b) and the electric actuator 1 returns to the state illustrated in FIG. 2, as a result of which the vehicle is brought into a state that the electric parking brake apparatus is released.

In this manner, in the present embodiment, the grease holding portion 22 is formed on the inner periphery of the one axial end of the nut 8. The grease holding portion 22 has an outer diameter larger than the diameter of the screw hole of this nut 8, and can contain the grease therein. Then, the cover member 23 covering the axial opening end of this grease holding portion 22 is provided. Therefore, even when the screw shaft 3 enters inside the nut 8 according to the rotation of the nut 8, the grease applied to this screw shaft 3 is held in the grease holding portion 22 of the nut 8. As a result, as illustrated in FIGS. 12(a) and 12(b), the present embodiment prevents that surplus grease is collected on the end surface of the nut 8, thereby preventing that the collected grease scatters around under a centrifugal force generated due to the rotation of the nut 8.

Further, the grease stored in the grease holding portion 22 of the nut 8 is applied to the screw shaft 3 when this screw shaft 3 exits out of the nut 8, and a part of this grease is held in the plurality of groove portions 21 formed on the thread 3b1 of the screw shaft 3. Then, the grease held in the plurality of groove portions 21 is supplied from the groove portions 21 to a narrow space (a backlash) A between the thread 3b1 of this screw shaft 3 and a thread 8a1 of the nut 8, and is supplied to the threadedly engaged portion between the male screw 3b of the screw shaft 3 and the female screw 8a of the nut 8 sliding against each other, as indicated by an arrow in FIG. 6. Therefore, the present embodiment can reduce friction on the threadedly engaged portion between the nut 8 and the screw shaft 3, thereby enhancing the motion conversion efficiency, and also reducing wear on the threadedly engaged portion to thus increase the durability of the nut 8 and the screw shaft 3.

Now, in the present embodiment, as illustrated in FIGS. 5 and 6, the taper surface 3c is formed on each of the peripheral edges on the flank 3b1 sides of each of the groove portions 21 formed on the threads 3b1 of the screw shaft 3. The taper surface 3c flares at the inclination angle α as becoming circumferentially farther away from this groove portion 21. Therefore, the grease held in each of the groove portions 21 is efficiently supplied by being dragged onto the threadedly engaged portion (the space Δ) between the nut 8 and the screw shaft 3 with the aid of the wedge effect due to the taper surface 3c as indicated by the arrow in FIG. 6, and this grease is provided for effective lubrication of the threadedly engaged portion.

Further, as illustrated in FIG. 12(b), when the screw shaft 3 advances, the application amount of the grease contained in the grease holding portion 22 is regulated by the cover member 23, and therefore the grease is applied over a wide range of the screw shaft 3 by a necessary and sufficient amount. As a result, the present embodiment can prevent partial grease insufficiency (oil film shortage) on the screw shaft 3 and achieve sufficient lubrication of the threadedly engaged portion between the nut 8 and the screw shaft 3, thereby enhancing the motion conversion efficiency, and also reducing wear on the threadedly engaged portion to thus increase the durability of the nut 8 and the screw shaft 3.

Then, in the present embodiment, as illustrated in FIG. 11, the inner diameter φD of the scraper portion 23b formed on the inner periphery of the cover portion 23A of the cover member 23 is set to be slightly larger than the outer diameter φd of the screw shaft 3 (φI>φd), by which the radial extremely small space δ is formed between them. Accordingly, the grease stored in the grease holding portion 22 of the nut 8 is scraped by the scraper portion 23b and this grease is evenly applied to the screw shaft 3 with a predetermined thickness 6 as illustrated in FIG. 12(b). In this case, because the scraper portion 23b is out of contact with the screw shaft 3, no frictional resistance force is generated therebetween, and the screw shaft 3 can maintain a smooth sliding movement without receiving resistance. Further, because the scraper portion 23b is not subjected to an external force from the screw shaft 3, this scraper portion 23b is prevented from incurring damage and the durability of the cover member 23 can be increased.

Then, the nut 8 is mounted by being inserted through the radial bearing 9, but the nut 8 can be attached without the cover member 23 interfering with the radial bearing 9 even if the nut 8 is inserted through the radial bearing 9 after the cover member 23 is attached to the nut 8 because the tubular portion 23B of the cover member 23 has an outer diameter equal to or smaller than the outer diameter of the sleeve portion 8A of the nut 8 (these diameters are equal in the present embodiment).

Further, in the present embodiment, the cover member 23 is made from a flexible and elastic rubber material, and therefore the present embodiment can also achieve an advantageous effect of preventing this cover member 23 from incurring damage even if this cover member 23 contacts the screw shaft 3 by some chance, thereby increasing the durability thereof.

Then, in the present embodiment, the groove portions 21 are each formed by cutting out a part of each of the threads 3b1 of the screw shaft 3 from the crest portion 3b12 toward the root portion 3b13 side. Therefore, the present embodiment allows the groove portions 21 for holding the grease to be formed easily with excellent workability, thereby achieving a cost reduction of this electric actuator 1 due to reductions in the processing man-hours and the processing time.

Further, as illustrated in FIG. 3, the plurality of groove portions 21 is arranged on the same straight line extending along the axial direction of the screw shaft 3, and therefore the plurality of groove portions 21 can be formed easily with excellent workability. Then, in the present embodiment, the groove portions 21 are each formed with the depth in the range from the crest portion 3b12 to the root portion 3b13 in the height direction of each of the threads 3b1 of the screw shaft 3 (the depth h of the groove portion 21 is set to be smaller than the height H of the thread 3b1 (h<H)), and the groove portions 21 are each prevented from being formed beyond the root portion 3b13 to the radially inner side thereof. Therefore, the present embodiment can improve the workability of these groove portions 21, and also prevent a local reduction in the strength of the screw shaft 3 due to the groove portions 21. On the other hand, in a case where the threads 3b1 of the screw shaft 3 are formed by cutting, providing the groove portions 21 deeply beyond the root portions 3b13 of the threads 3b1 causes burrs to enter the groove portions 21, and these burr, are not easy to remove.

Further, in the present embodiment, the seven groove portions 21 for holding the grease are formed on each of the threads 3b1 of the screw shaft 3 in the circumferential direction thereof. Therefore, the present embodiment allows a large amount of grease to be held by the plurality of threads 21, thereby allowing the threadedly engaged portion between the nut 8 and the screw shaft 3 to be effectively lubricated due to the large amount of grease held in the plurality of groove portions 21. Further, with respect to the threads 3b1 of the screw shaft 3, the seven groove portions 21 for each of them are formed in the circumferential direction thereof at equiangular pitches, and therefore the grease is circumferentially evenly supplied to the threadedly engaged portion between the nut 8 and the screw shaft 3, and this also contributes to effective lubrication of the threadedly engaged portion with the grease.

The plurality of groove portions 21 for holding the grease is formed on each of the threads 3b1 of the screw shaft 3 in the above-described embodiment, but similar groove portions 31 may be formed on the threads 8al of the female screw 8a of the nut 8, or groove portions 21, 31 may be formed on both the threads 3b1 of the screw shaft 3 and the threads 8al of the nut 8.

Further, the above-described embodiment has been described citing the configuration in which the present invention is applied to the electric actuator provided to the electric parking brake apparatus of the vehicle drum brake, but the present invention is also applicable to an electric actuator used in another arbitrary apparatus.

Besides that, it is apparent that the applicability of the present invention shall not be limited to the above-described embodiment, and can be modified in various manners within the scope of the technical idea recited in the claims, the specification, and the drawings.

The invention claimed is:

1. An electric actuator comprising:
   an electric motor;
   a first screw member configured to be rotationally driven by the electric motor; and
   a second screw member threadedly inserted through the first screw member linearly movably,
   where each of a thread of the first screw member and a thread of the second screw member includes two flanks and a crest portion connecting the two flanks to each other, and a threadedly engaged portion between the first screw member and the second screw member is lubricated with grease,
   wherein at least one groove portion is formed on the thread of at least one of the first screw member and/or the second screw member,
   wherein the at least one groove portion is cut out from the crest portion toward a root portion side of the respective thread and is configured to hold grease, and
   wherein a tapered surface is formed at the groove portion side end of at least one of the two flanks, and the tapered surface inclines in a direction away from the groove portion and functions to drag the grease held in the groove portion onto the threadedly engaged portion with the aid of the wedge effect.

2. The electric actuator according to claim 1, wherein the at least one groove portion includes a plurality of groove portions formed on a straight line extending along an axial direction of the first screw member or an axial direction of the second screw member.

3. The electric actuator according to claim 1, wherein the at least one groove portion includes a plurality of groove portions formed in a circumferential direction of the first screw member and/or a circumferential direction of the second screw member.

4. The electric actuator according to claim 1, wherein the at least one groove portion is formed with a depth in a range from the crest portion to the root portion in a height direction of the respective thread.

5. The electric actuator according to claim 1, wherein a grease holding portion is formed on an inner periphery of one axial end of the first screw member, the grease holding portion having an outer diameter larger than a maximum diameter of the second screw member and being capable of containing the grease between the grease holding portion and the second screw member, and wherein a cover member covering an axial opening end of the grease holding portion is provided.

6. The electric actuator according to claim 5, wherein the cover member integrally includes a cover portion and a tubular portion coaxial with the first screw member, wherein a cylindrical scraper portion is formed on an inner periphery of the cover portion, the cylindrical scraper portion having an inner diameter larger than an outer diameter of the second screw member and is configured to scrap the grease stored in the grease holding portion.

7. The electric actuator according to claim 5, wherein the cover member is provided on an outer peripheral surface of the first screw member.

8. The electric actuator according to claim 1, wherein the at least one groove portion is formed with a depth that is less than a height of the respective thread.

* * * * *